United States Patent
Hodge

(10) Patent No.: US 8,134,344 B2
(45) Date of Patent: Mar. 13, 2012

(54) REGULATION CONTROL FOR VARIABLE FREQUENCY GENERATORS

(75) Inventor: David Hodge, Oro Valley, AZ (US)

(73) Assignee: Honeywell International, Inc., Morristown, NJ (US)

(*) Notice: Subject to any disclaimer, the term of this patent is extended or adjusted under 35 U.S.C. 154(b) by 876 days.

(21) Appl. No.: 12/173,620

(22) Filed: Jul. 15, 2008

(65) Prior Publication Data

US 2010/0013443 A1      Jan. 21, 2010

(51) Int. Cl.
*H02P 9/00* (2006.01)

(52) U.S. Cl. ............... 322/29; 322/25; 322/27; 322/28; 322/32; 323/283

(58) Field of Classification Search .......... 322/22, 322/23, 24, 25, 27, 28, 29, 32; 323/271, 323/282, 283, 284

See application file for complete search history.

(56) References Cited

U.S. PATENT DOCUMENTS

| | | | | |
|---|---|---|---|---|
| 4,623,833 A * | 11/1986 | Edwards | ........................ | 322/28 |
| 5,521,486 A * | 5/1996 | Takamoto et al. | ............... | 322/99 |
| 5,583,420 A | 12/1996 | Rice et al. | | |
| 5,663,632 A | 9/1997 | Roseman et al. | | |
| 6,028,416 A | 2/2000 | Tallarek | | |
| 6,850,043 B1 | 2/2005 | Maddali | | |
| 7,183,749 B2 * | 2/2007 | Maehara | ........................ | 322/22 |
| 2006/0049808 A1 * | 3/2006 | Yao | .................. | 322/25 |
| 2006/0061335 A1 | 3/2006 | Inokuchi et al. | | |
| 2007/0159139 A1 | 7/2007 | Yao | | |

* cited by examiner

*Primary Examiner* — Adolf Berhane
*Assistant Examiner* — Nguyen Tran
(74) *Attorney, Agent, or Firm* — Michael A. Shimokaji, Esq.

(57) ABSTRACT

A variable frequency generator regulation control circuit and method for controlling open loop gain under changing generator speed conditions employing a high frequency pulse-width modulated signal with a duty cycle that is controlled such that variations in rectified PMG voltage and generator gain over the generator speed range can be compensated for. This signal is modulated by a low frequency pulse-width modulated signal provided by the generator regulator, using a logic gate to produce a combined signal representing an average voltage signal applied to a generator field winding as the generator speed fluctuates.

17 Claims, 4 Drawing Sheets

REGULATION CONTROL FOR VARIABLE FREQUENCY GENERATORS

BACKGROUND OF THE INVENTION

The present invention relates generally to the field of generator control unit regulation and more particularly, to regulation of variable frequency generators.

In the field of variable frequency generators, it is often desirable to eliminate parasitic factors. Variable frequency generators and their generator control unit regulators have an associated open loop gain that can increase as a function of the speed of the variable frequency generator. Higher generator speeds can cause problems with closed loop stability resulting in poor transient response or instability when the open loop gain is uncontrolled.

Both the generator gain (output voltage/field current) and the generator control unit regulation loop gain can increase with speed if the regulator is supplied by an unregulated rectified permanent magnet generator, sometimes provided to the generator control unit by the generator.

It is known in the art to control the open loop gain of the generator and generator control unit by regulating the permanent magnet generator voltage using a pre-regulator to provide a constant field voltage supply over the speed range. One example can be seen in U.S. Pat. No. 6,909,262. The pre-regulators can include components such as transformers, inductors, etc. and can weigh as much as 2-3 pounds.

It is also known in the art to reduce the analog gain of the regulator as a function of the permanent magnet generator voltage before it is converted into a pulse-width modulated signal to drive a field control switch. This approach can result in narrow pulse-width modulation pulses driving the field control switch at higher generator speeds which can be susceptible to perturbation due to noise, which, in turn result in control loop inaccuracies and instability.

It is also known in the art to regulate a generator control circuit by employing various circuits to monitor voltage change rates and decrease the power to the generator when multiple conditions are satisfied. An example can be seen in U.S. Publication No. 2007/0159139 (FIG. 1). Still yet, it is known in the art to use a single pulse-width modulated signal, a switch, a regulator, and a fault condition detector to identify fault conditions on a vehicle generator. One example can be seen in U.S. Publication No. 2006/0061335 (FIG. 1). Such methods address excessive voltages on the generator but do not address regulating a consistent average voltage to the field winding as generator speeds increase.

As can be seen, there is a need for a lightweight and improved approach to regulating the open loop gain of a variable frequency generator.

SUMMARY OF THE INVENTION

In one aspect of the present invention, a regulator control apparatus for use with a variable frequency generator having a field winding, comprises a voltage regulator supplying a low frequency drive pulse-width modulated voltage signal from a first voltage source, a duty cycle controller supplying a high frequency pulse-width modulated voltage signal from a second voltage source, and an AND gate for receiving the low and high frequency pulse-width modulated voltage signals and for modulating the high frequency pulse-width modulated voltage signal with the low frequency pulse-width modulated voltage signal to produce a combined drive signal representing an average voltage signal for supply to the field winding.

In another aspect of the present invention, a regulator control apparatus for use with a variable frequency generator having a permanent magnet generator (PMG) voltage source producing a generator speed and a PMG input comprises, a voltage regulator coupled to a point of regulation supplying a drive pulse-width modulated signal, a field switch driver in connection with a field switch for controlling open loop gain on the PMG voltage source, a logic gate coupled between the voltage regulator and the field switch driver, a duty cycle controller circuit supplying a permanent magnet generator voltage pulse-width modulated signal coupled between the logic gate and the permanent magnet generator input and wherein the logic gate modulates the drive pulse-width modulated signal with the permanent magnet generator voltage pulse-width modulated signal to output a combined drive signal supplied to the field switch driver.

In still yet another aspect of the present invention, a method of controlling open loop gain comprises the steps of determining an optimal average voltage applied to the field winding, detecting a regulator drive pulse-width modulated signal applied to the field winding, supplying a second pulse-width modulated signal from a duty cycle controller with a higher frequency than the regulator drive signal, modulating the second pulse-width modulated signal with the regulator drive pulse-width modulated signal to produce an average voltage signal applied to the field winding approximating the optimal average voltage as the voltage range and speed range of the variable frequency generator vary.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The regulation control circuit of the present invention is described for exemplary use in variable frequency generators. One desirable example includes use in aerospace generators for aircraft where a generator and regulator employing the present invention can be bolted on to an engine gear box. Space and weight are considered by some a premium factor in aircraft design as weight loads and aerodynamic efficiency are motivated by efforts to increase fuel efficiency. In an exemplary application, a variable frequency generator employing the regulation control circuit of the present invention generally operates at a power of 150 kilovolt-amps-350 kilovolt-amps producing signal output frequencies between 360 Hz-800 Hz.

The present invention may employ a lightweight and space saving design. A regulator control of the present invention, unlike the prior art, uses a low frequency pulse-width modulated (PWM) voltage signal in a regulator to modulate a second high frequency second PWM voltage signal thereby preventing the low frequency PWM signal duty cycle from becoming unmanageably small and thereby preventing the open loop gain of the generator and regulator from becoming too high and leading to generator output instability as the generator speed fluctuates between low and high. One result of this design is the production of a modulated combined drive signal such that the second high frequency PWM signal in effect provides a constant average field supply voltage for the regulator that is modulated by the low frequency PWM signal from the regulator to provide the required field current to the field winding as generator speeds fluctuate.

Figure 1:
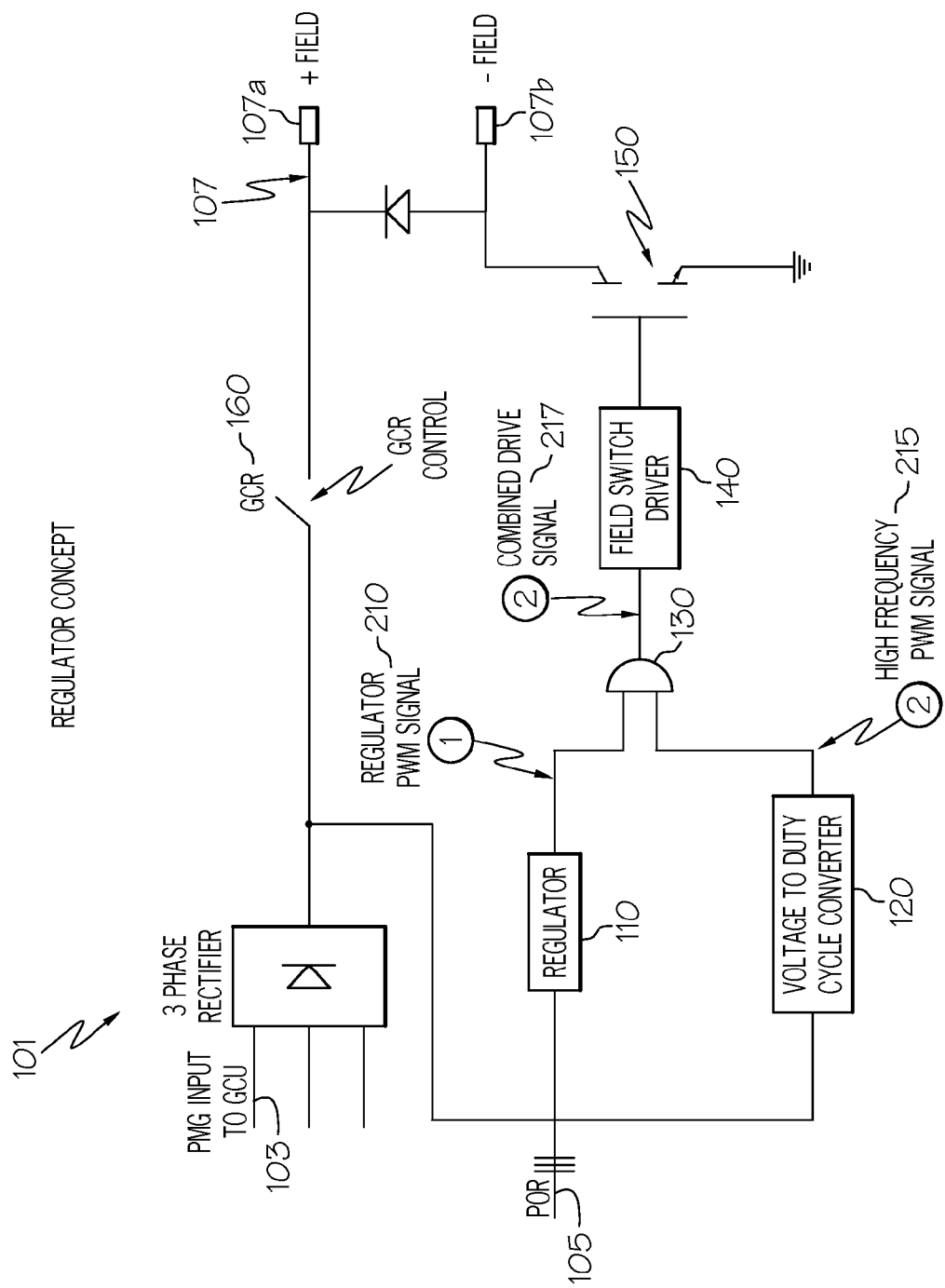
FIG. 1 is a schematic illustrating, a generator control circuit design in accordance with the present invention.

Referring to FIG. 1, in general, a regulation control circuit 101 of the present invention includes a permanent magnet generator (PMG) voltage input 103, a point of regulation 105, a field transistor 150, a voltage regulator 110, a duty cycle controller 120, a logic gate 130, and a field switch driver 140. The voltage regulator and duty cycle controller provide the inputs to the logic gate 130. The logic gate output is connected in series with the field switch driver, which in turn is connected to the field switch.

In one embodiment of the regulation control circuit 101, the duty cycle controller 120 is a voltage to duty cycle converter, which takes the rectified PMG voltage as input from a three-phase rectifier 102. The regulator 110 receives a voltage signal from the point of regulation 105. The logic gate 130 is an AND gate whose output is coupled serially to the field switch driver 140 and a field transistor 150 whose collector terminal is coupled to the negative field output 107b. The field outputs are 107a and 107b.

Figure 2:
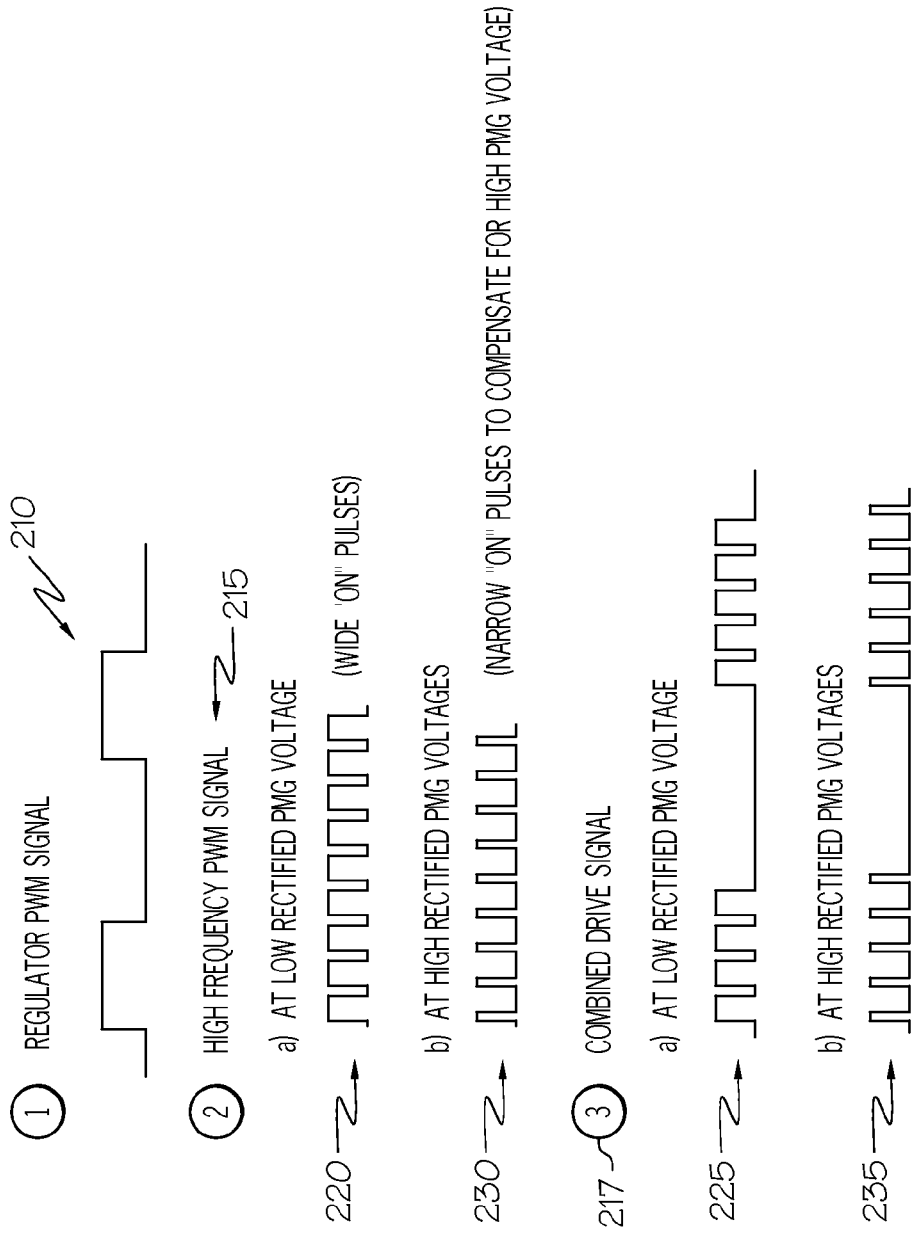
FIG. 2 is an illustration depicting representative waveforms used in the circuit design of FIG. 1.

Referring to FIGS. 1 and 2, the regulation control circuit 101 utilizes a voltage regulator 110 in conjunction with a duty cycle controller 120 to produce a combined drive signal 217. The voltage regulator operates at relatively low frequencies generating a drive pulse-width modulated signal 210 in an exemplary range between 1200 Hz-2400 Hz. The duty cycle controller has a duty cycle controlled by a rectified PMG voltage signal received from the permanent magnet generator input 103 and produces in general, a relatively higher frequency pulse-width modulated signal 215 in an exemplary range between 25 kHz to 200 kHz. Depending on the PMG voltage input, this signal may further be considered either a high frequency pulse-width modulated signal 220 at low PMG voltages or a high frequency pulse-width modulated signal 230 at high PMG voltages. The duty cycle controller will set the duty cycle so that in effect the average field supply voltage remains constant when the variable frequency generator speeds fluctuate from high to low. Typically the rectified PMG voltages can vary over a range of 6:1 depending on generator speed and loading.

In operation, the relatively low frequency drive pulse-width modulated signal 210 modulates the relatively higher frequency pulse-width modulated signal 215. The logic gate 130 receives the drive pulse-width modulated signal 210 and high frequency pulse-width modulated signal which can range between signal 220 or 230 depending on the rectified PMG voltage, and performs a modulation by ANDing the two signals into a combined drive which will range between signal 225 (at Low rectified PMG voltage) or 235 (at High rectified PMG voltage). The duty cycle of the drive pulse-width modulated signal may be such that at low rectified PMG voltages the "ON" time is large in proportion to the "OFF" and at high rectified PMG voltages the "ON" time is small in proportion to the "OFF" time. Thus, the average field supply voltage associated with the combined drive signal 225 or 235 or ranges in between that may be transmitted to the field switch driver 140 and subsequently applied to the field winding via field transistor 150 when the regulator commands the field "ON" will be approximately constant over the PMG voltage range and the speed range of the generator.

Figure 3:
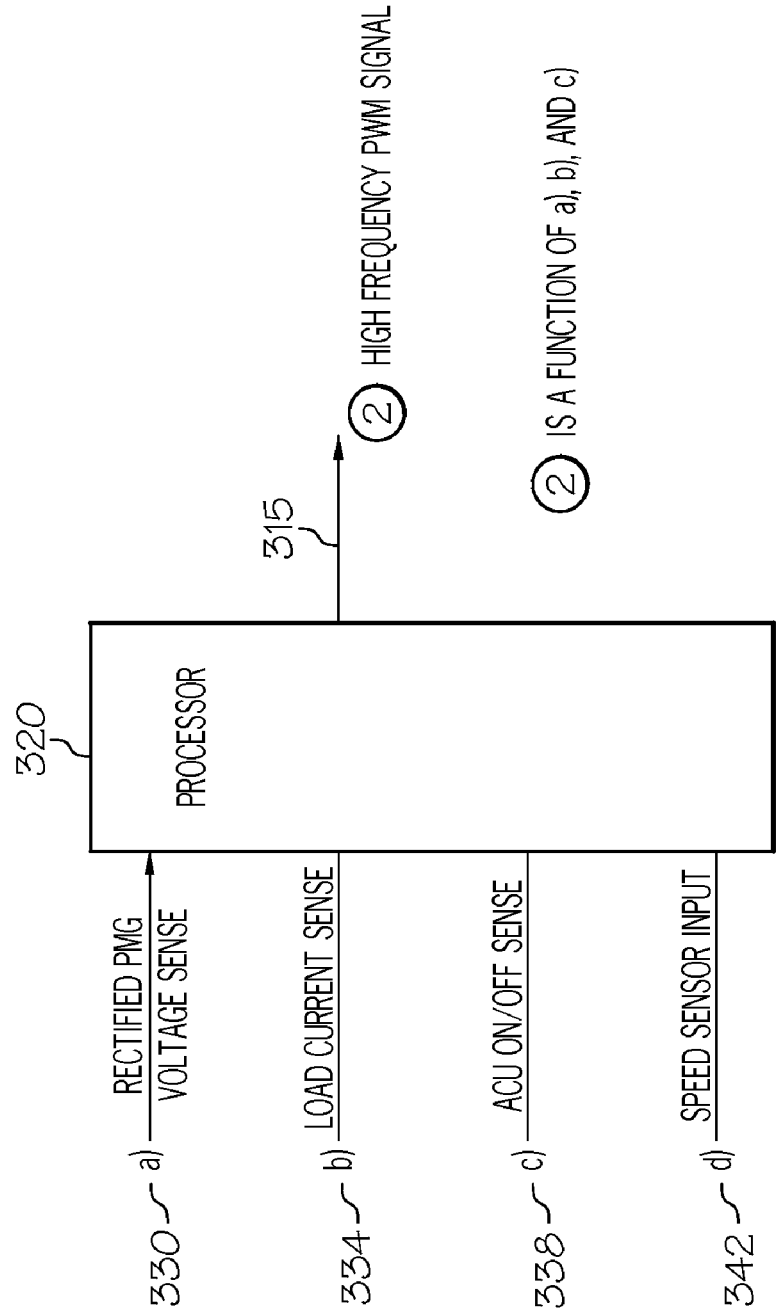
FIG. 3 is a partial schematic illustrating in part, another embodiment of the circuit design of FIG. 1 using a processor component.

Referring to FIG. 3, it will be understood that although the present invention has been described in the context of generating an average field supply voltage, modifications to the implementation of the duty cycle controller can provide other desirable signals to the circuit. In another embodiment, one exemplary manner of implementing the duty cycle controller uses a digital processor unit 320 for supplying a high frequency pulse modulated width signal 315. The processor unit may include sensors for various signals. Exemplary signal sensor may include a rectified PMG voltage sensor 330, a load current sensor 334, a generator control unit on/off sensor 338 and a speed sensor 342.

As signals are sensed by either one or a combination of sensors 330, 334, 338 or 342, a resultant high frequency pulse-width modulated signal 315 may be produced as a function of the inputted signals to provide varied control over the average field voltage applied to the field. For example, the processor can detect changes in generator speed from the speed sensor input 342 and produce pulse-width modulated signals to the field switch driver which may reduce the average field supply voltage applied to the field winding as generator speed increases to compensate for increases in generator gain. Additionally, the generator control unit on/off sensor 338 can cause the processor to supply pulse-width modulated signals so that the resultant combined pulse-width modulated signal produces gradually rising average field voltages when the generator is commanded on for controlled generator build up. In another example, a transient condition can be sensed in the load current sensor 334 for altering the average field supply voltage. For example, if a load "on" transient condition is detected, the duty cycle controller can supply a pulse-width modulated signal of increased duty cycle to the field switch driver to momentarily raise the average field supply voltage during the transient condition. In the alternative, if a transient condition is detected as "off", a pulse-width modulated signal of reduced duty cycle can be supplied to momentarily reduce the average field supply voltage.

Figure 4:
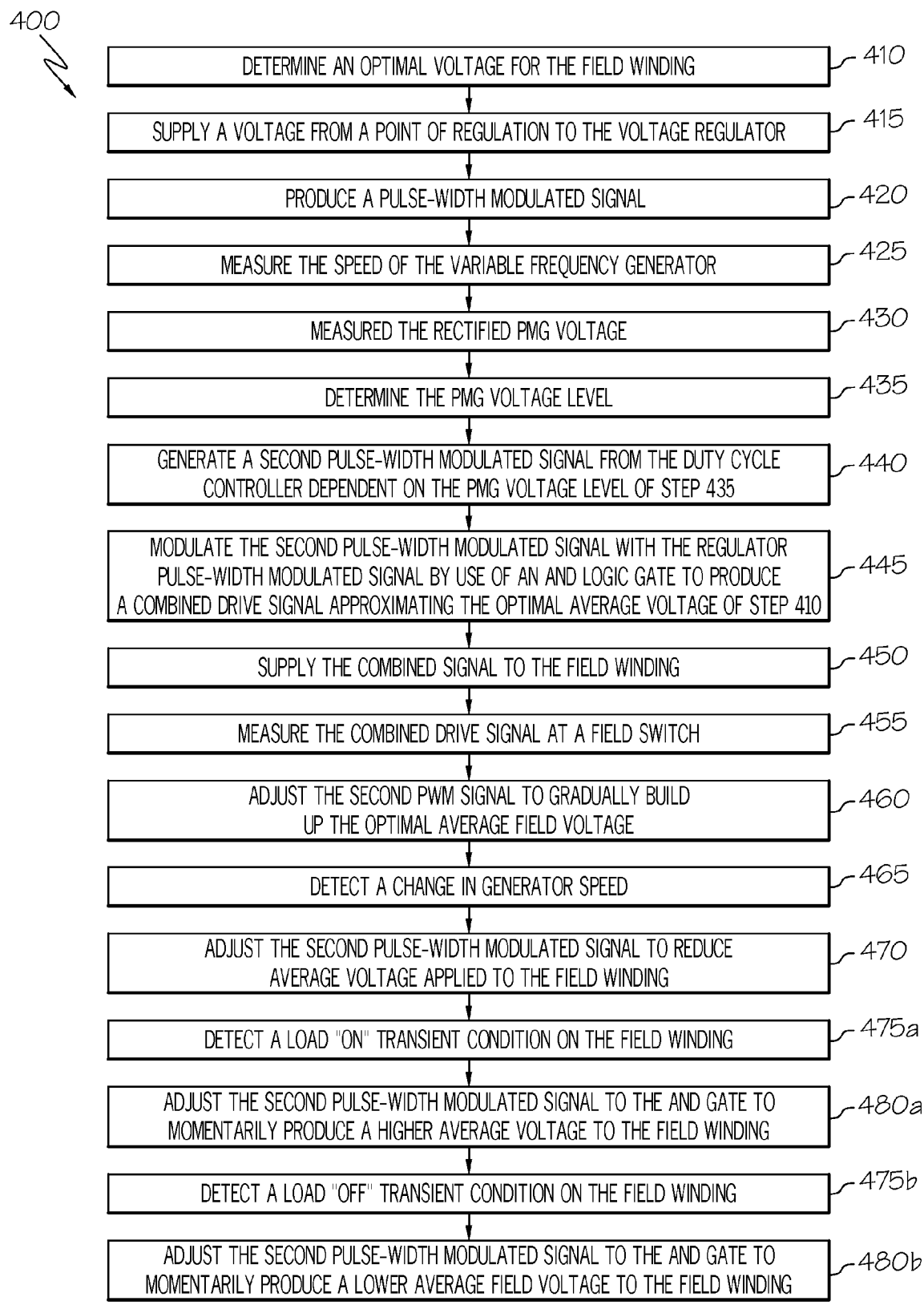
FIG. 4 is a flow chart illustrating the steps followed in performing a method of an embodiment of the present invention.

FIG. 4 illustrates a series of steps followed by an exemplary method of implementing an embodiment of the present invention. At step 410, an optimal voltage for the field winding is determined. In steps 415 and 420, a voltage from a point of regulation is supplied to the voltage regulator drive where a pulse-width modulated signal is produced. At steps 425 and 430, the speed of the variable frequency generator and its rectified PMG voltage is measured. A determination is made in step 435 as to the level of the rectified PMG voltage (high, low or in between). Depending on the PMG voltage state determination of step 435, a second pulse-width modulated signal is generated from the duty cycle controller. This second pulse-width modulated signal has a frequency higher than the pulse-width modulated signal of the regulator drive of step 420. In step 445, the second pulse-width modulated signal is modulated by the regulator drive signal by use of an AND logic gate to produce a combined drive signal approximating the optimal average voltage of step 410. In step 450, the combined signal is then supplied to the field winding.

It will be understood that expedient modifications to the method of FIG. 4 can continue to adjust the regulation of the open loop gain of the variable frequency generator. For example, an optional step 455 continues the method by measuring the combined drive signal at a field switch and in step 460, adjusting the second pulse width modulated signal to gradually build up the optimal average field voltage generated in step 455. Likewise, it is also optional to approach adjustment by detecting a change in generator speed (step 465) and then, in step 470, adjusting the output of the second pulse-width modulated signal from the duty cycle controller to reduce average voltage applied to the field winding. Similarly optional, one may control transient loads on the variable frequency generator. In step 475*a*, a load "on" transient condition is detected on the field winding. Then, in step 480*a*, the duty cycle controller is controlled to supply a pulse-width modulated signal to the AND gate to momentarily produce a higher average voltage to the field winding. Conversely, if a load "off" condition is detected (step 475*b*), the duty cycle controller will be controlled to momentarily produce a lower average field voltage to the field winding.

It should be understood, of course, that the foregoing relates to exemplary embodiments of the invention and that modifications may be made without departing from the spirit and scope of the invention as set forth in the following claims.

I claim:

1. A regulator control apparatus for use with a variable frequency generator having a field winding, comprising:
   a voltage regulator supplying a low frequency drive pulse-width modulated voltage signal produced from a voltage input received from a first voltage source;
   a duty cycle controller supplying a high frequency pulse-width modulated voltage signal produced from a voltage input received from a second voltage source;
   an AND gate for receiving the low and high frequency pulse-width modulated voltage signals and for modulating the high frequency pulse-width modulated voltage signal with the low frequency pulse-width modulated voltage signal to produce a combined drive signal representing an average voltage signal for supply to the field winding;
   a digital processor for controlling the high frequency pulse-width modulated signal; and
   a load current sensor for detecting a transient load on the variable frequency generator and controlling the processor to adjust a duty cycle of the high frequency pulse-width modulated signal to produce an adjusted average voltage from the combined drive signal.

2. The regulator control of claim 1, wherein:
   the duty cycle controller is a voltage to duty cycle converter for determining whether the high frequency pulse-width modulated voltage signal is a low or high permanent magnet generator voltage.

3. The regulator control of claim 1, wherein:
   the duty cycle controller includes a generator control unit sensor for detecting a command on or off state for generating a gradual increase in the duty cycle of the high frequency pulse width modulated signal to control a build up of a generator output when the generator is turned on.

4. A regulator control apparatus for use with a variable frequency generator having a permanent magnet generator (PMG) voltage source producing a generator speed and a PMG input, comprising:
   a voltage regulator coupled to a point of regulation supplying a drive pulse-width modulated signal;
   a field switch driver in connection with a field switch for controlling open loop gain on the PMG voltage source;
   a logic gate coupled between the voltage regulator and the field switch driver;
   a duty cycle controller circuit supplying a permanent magnet generator voltage pulse-width modulated signal coupled between the logic gate and the permanent magnet generator input; and wherein
   the logic gate modulates the drive pulse-width modulated signal with the permanent magnet generator voltage pulse-width modulated signal to output a combined drive signal supplied to the field switch driver,
   the duty cycle controller is a generator speed to duty cycle converter which receives a generator speed sensing signal from the permanent magnet generator voltage source,
   the permanent magnet generator voltage pulse-width modulated signal is a high frequency pulse-width modulated signal including a duty cycle, and
   the generator speed to duty cycle converter adjusts the duty cycle of the high frequency pulse-width modulated signal depending on the generator speed to represent an average field supply voltage signal to compensate for the increase in generator gain.

5. The regulator control apparatus of claim 4, wherein:
   the duty cycle controller circuit produces the permanent magnet generator voltage pulse-width modulated signal with a higher frequency than the drive pulse-width modulated signal.

6. The regulator control apparatus of claim 4, wherein:
   the duty cycle controller circuit produces the permanent magnet generator voltage pulse-width modulated signal with a duty cycle "on" time large in proportion to the duty cycle "off" time when the permanent magnet generator generates a lower voltage than the duty cycle controller circuit pulse-width modulated signal.

7. The regulator control apparatus of claim 4, further comprising:
   a digital processor for controlling the permanent magnet generator pulse-width modulated signal.

8. The regulator control apparatus of claim 7, further comprising:
   a rectified PMG voltage sensor coupled to the digital processor for detecting generator speed increases and for generating a reduced average voltage in the combined drive signal.

9. The regulator control apparatus of claim 7, further comprising:
   a generator control unit sensor coupled to the digital processor for detecting an on or off state and for generating a gradual build up or reduction of voltage in the combined signal.

10. A method of controlling open loop gain of a variable frequency generator with a field winding, the variable frequency generator having a voltage range and a speed range, comprising:
   determining an optimal average voltage applied to the field winding;
   detecting a regulator drive pulse-width modulated signal applied to the field winding;
   supplying a second pulse-width modulated signal from a duty cycle controller with a higher frequency than the regulator drive signal; and
   modulating the second pulse-width modulated signal with the regulator drive pulse-width modulated signal to produce an average voltage signal applied to the field winding approximating the optimal average voltage as voltage range and speed range of the variable frequency generator vary.

11. The method of controlling open loop gain of claim 10, wherein said average voltage signal applied to the field winding has an average voltage speed, further comprising:
 determining an increase in generator speed; and
 reducing average voltage speed applied to the field winding.

12. The method of controlling open loop gain of claim 10, further comprising:
 detecting a load "on" transient condition; and wherein
 the duty cycle controller supplies the second pulse-width modulated signal to produce a higher average field voltage signal to the field winding.

13. The method of controlling open loop gain of claim 10, further comprising:
 detecting a load "off" transient condition; and wherein
 the duty cycle controller supplies the second pulse-width modulated signal to produce a lower average field voltage signal to the field winding.

14. The method of controlling open loop gain of claim 10, wherein:
 the second pulse-width modulated signal is controlled to gradually build up an average field voltage.

15. The method of controlling open loop gain of claim 10, wherein:
 the second pulse-width modulated signal is controlled by a digital processor.

16. The method of controlling open loop gain of claim 10, wherein:
 the second pulse-width modulated signal is produced with an "on" time large in proportion to an "off" time when the second pulse-width modulated signal is a lower permanent magnet generator voltage than the regulator drive permanent magnet generator voltage.

17. The method of controlling open loop gain of claim 10, wherein:
 the second pulse-width modulated signal is produced with an "off" time large in proportion to an "on" time when the second pulse-width modulated signal is a higher permanent magnet generator voltage than the regulator drive permanent magnet generator voltage.

* * * * *